June 23, 1959  J. M. YOVANOVICH ET AL  2,891,368
BAST FIBER PLANT HARVESTING MACHINE
Filed Oct. 13, 1958  7 Sheets-Sheet 1
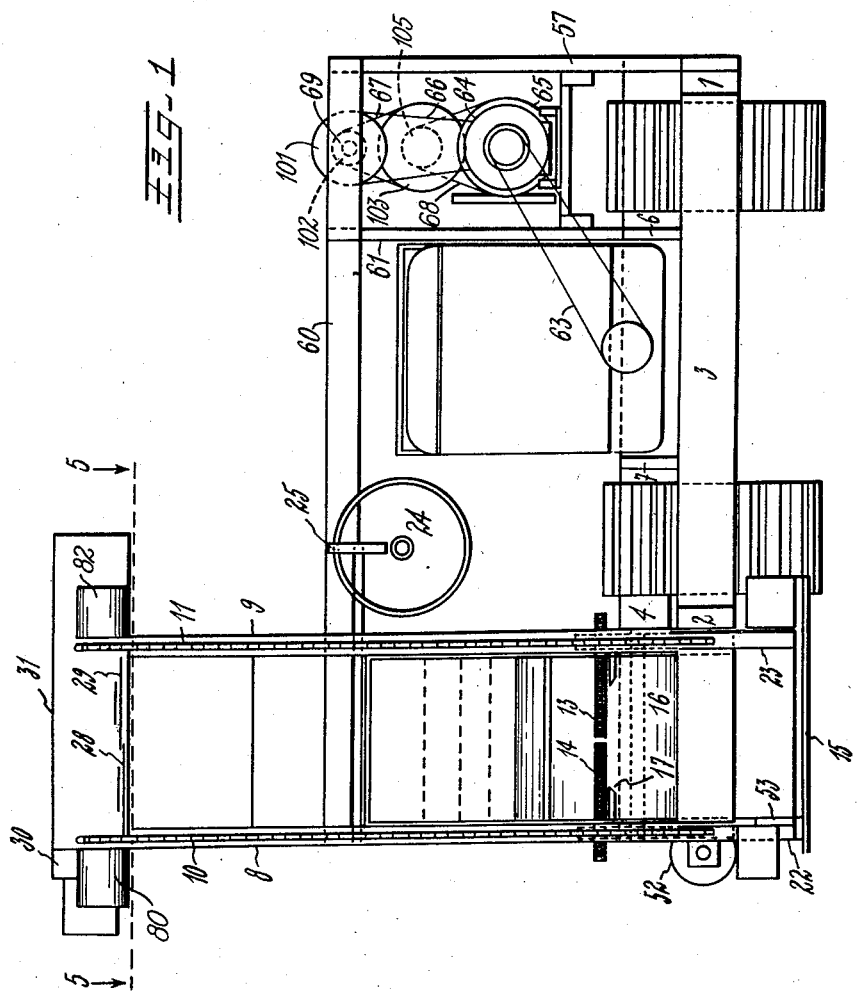
INVENTORS.
JOHN M. YOVANOVICH
JOSEPH F. DRYER, JR.
BY F. H. Henson
ATTORNEY

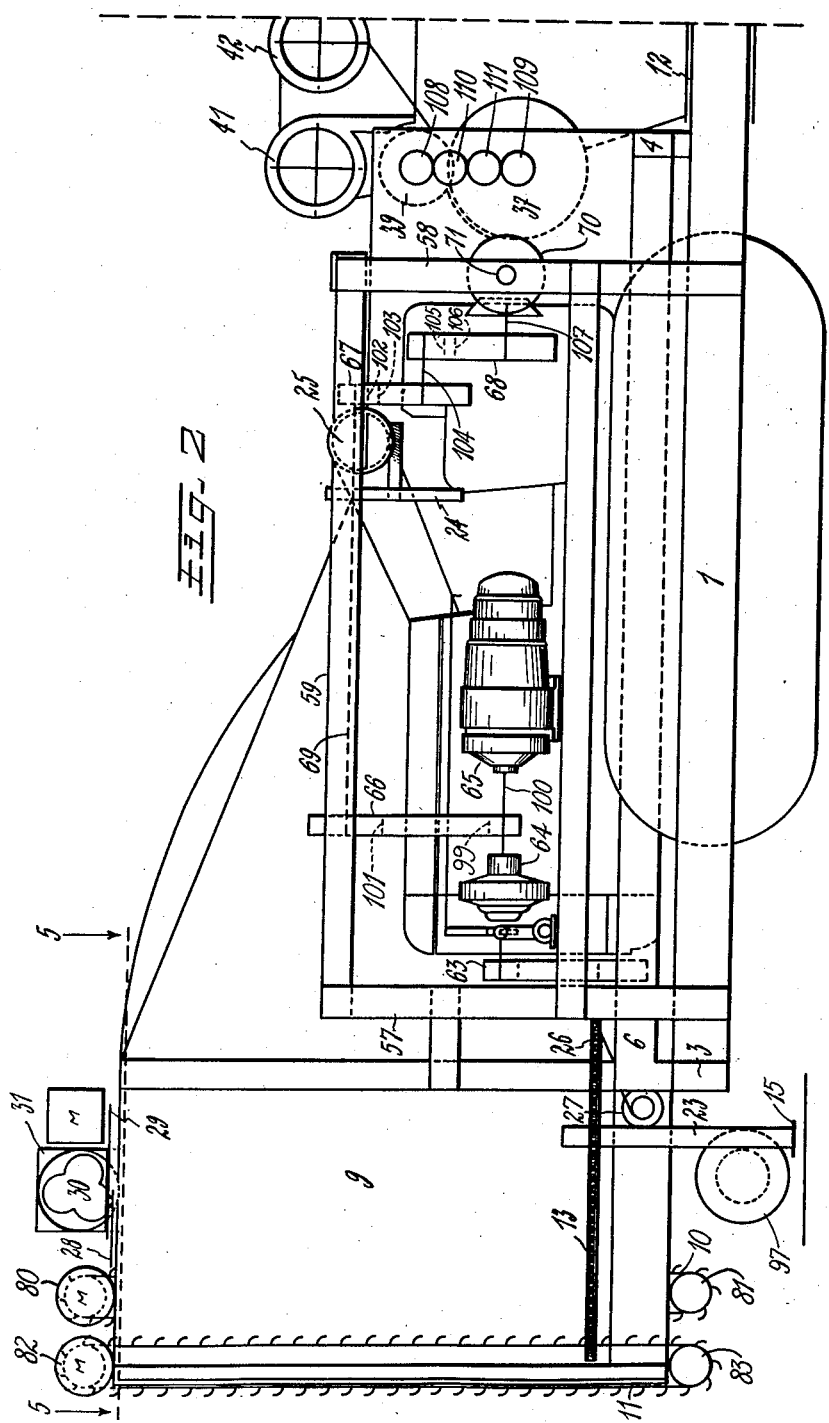

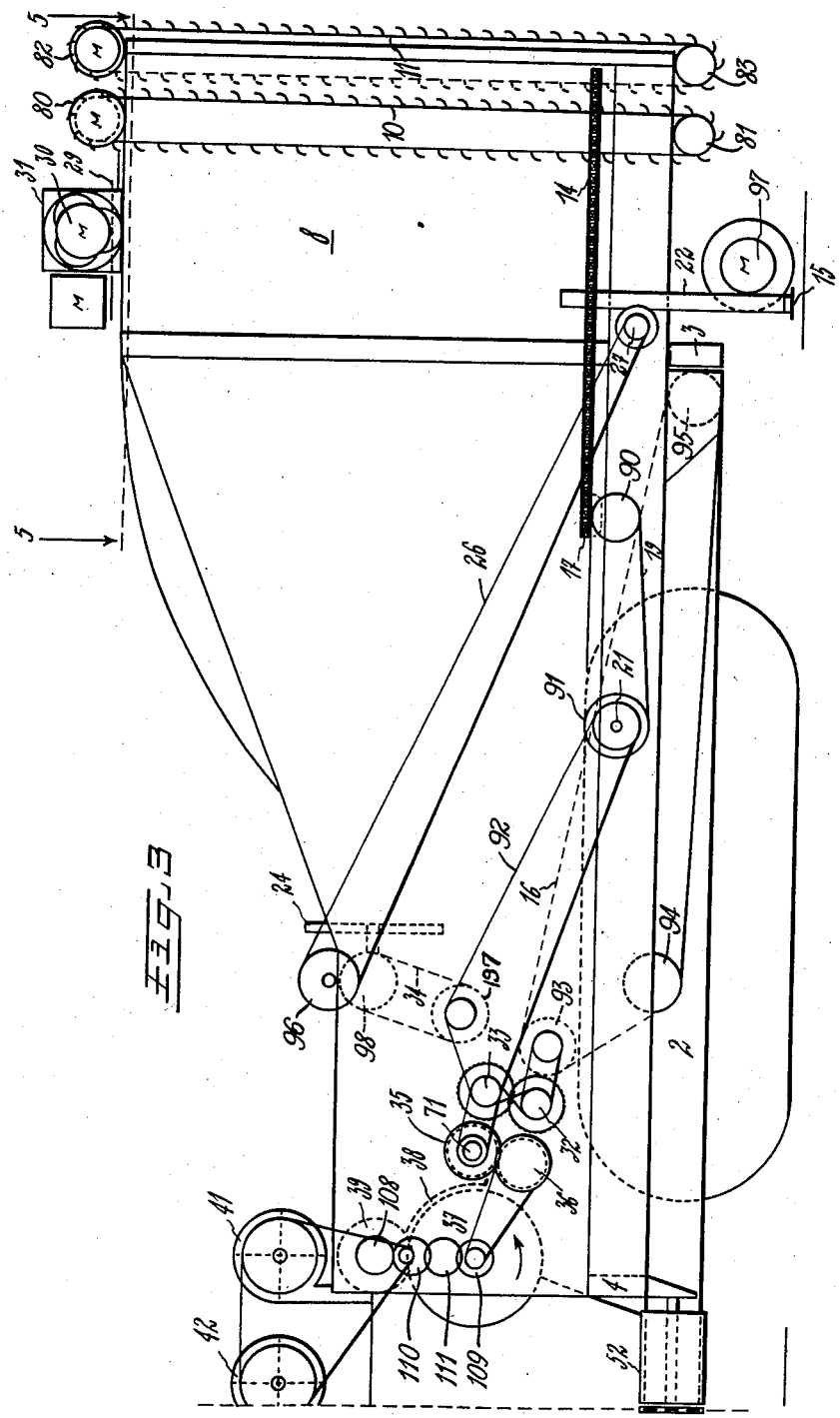

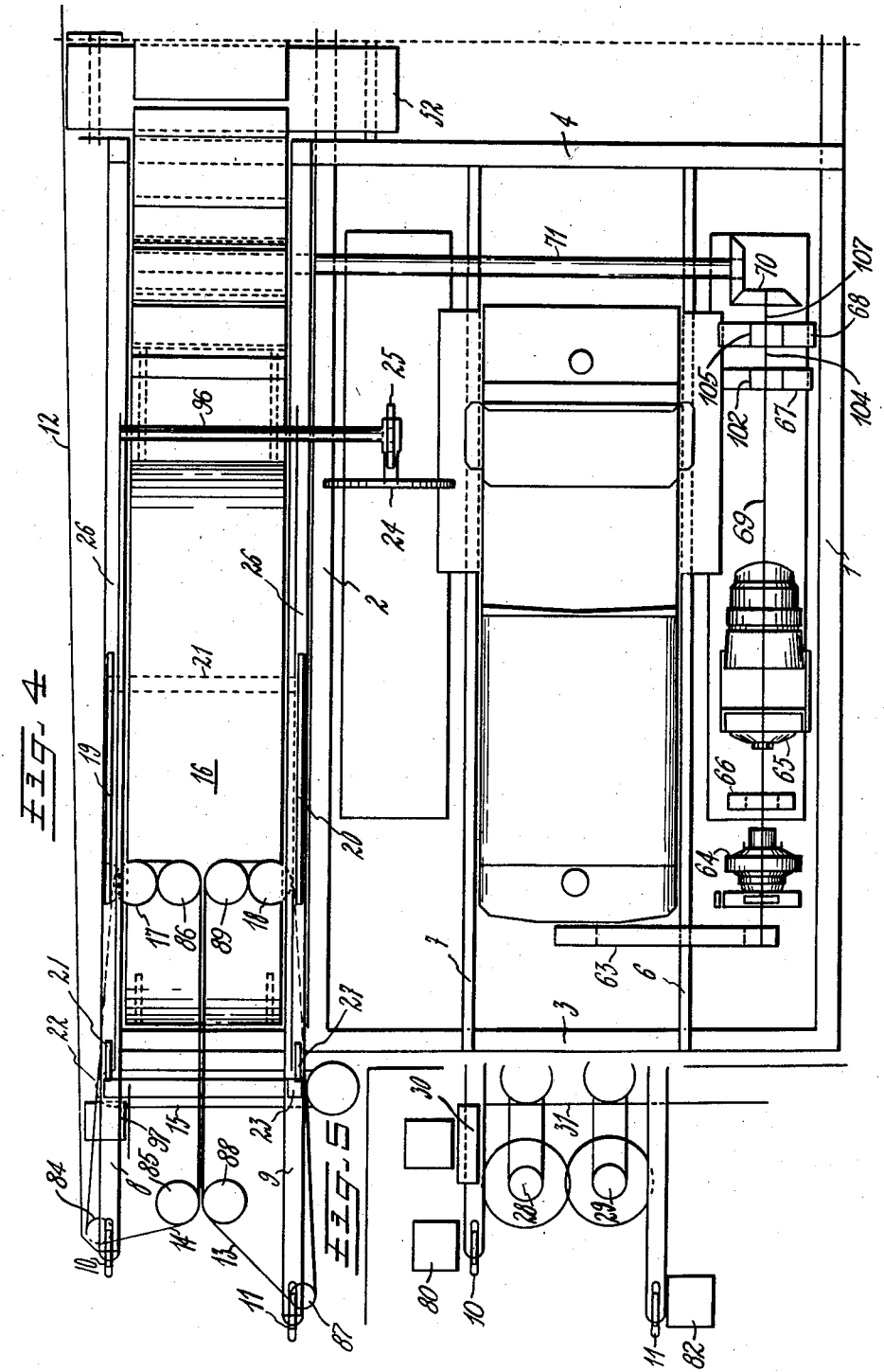

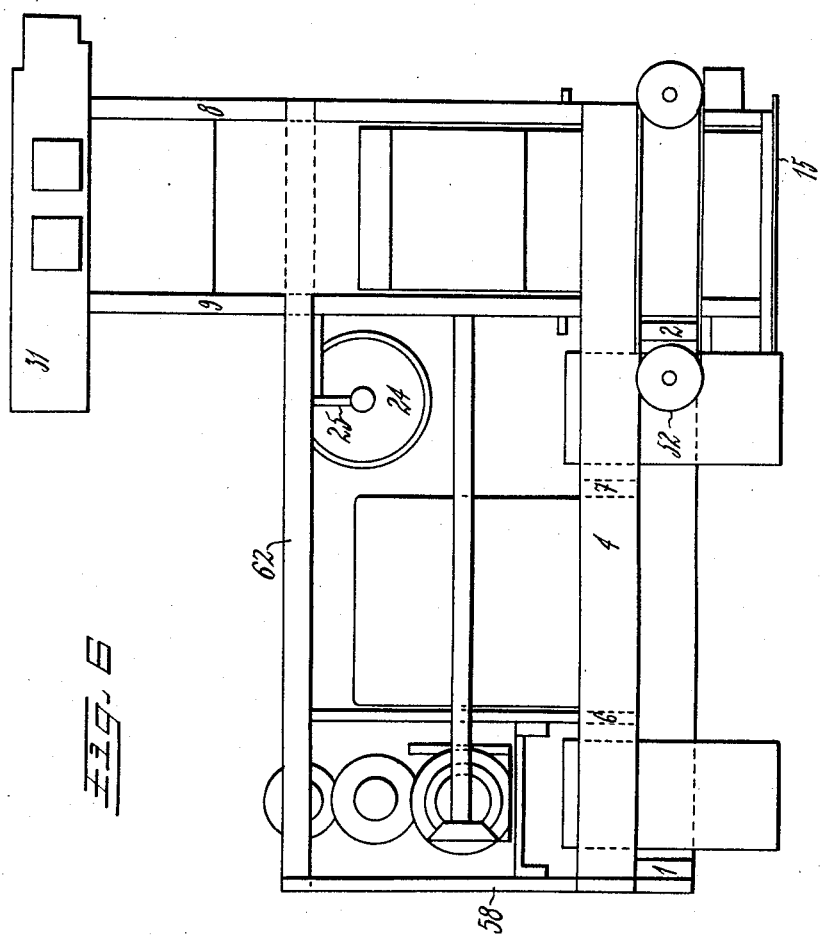

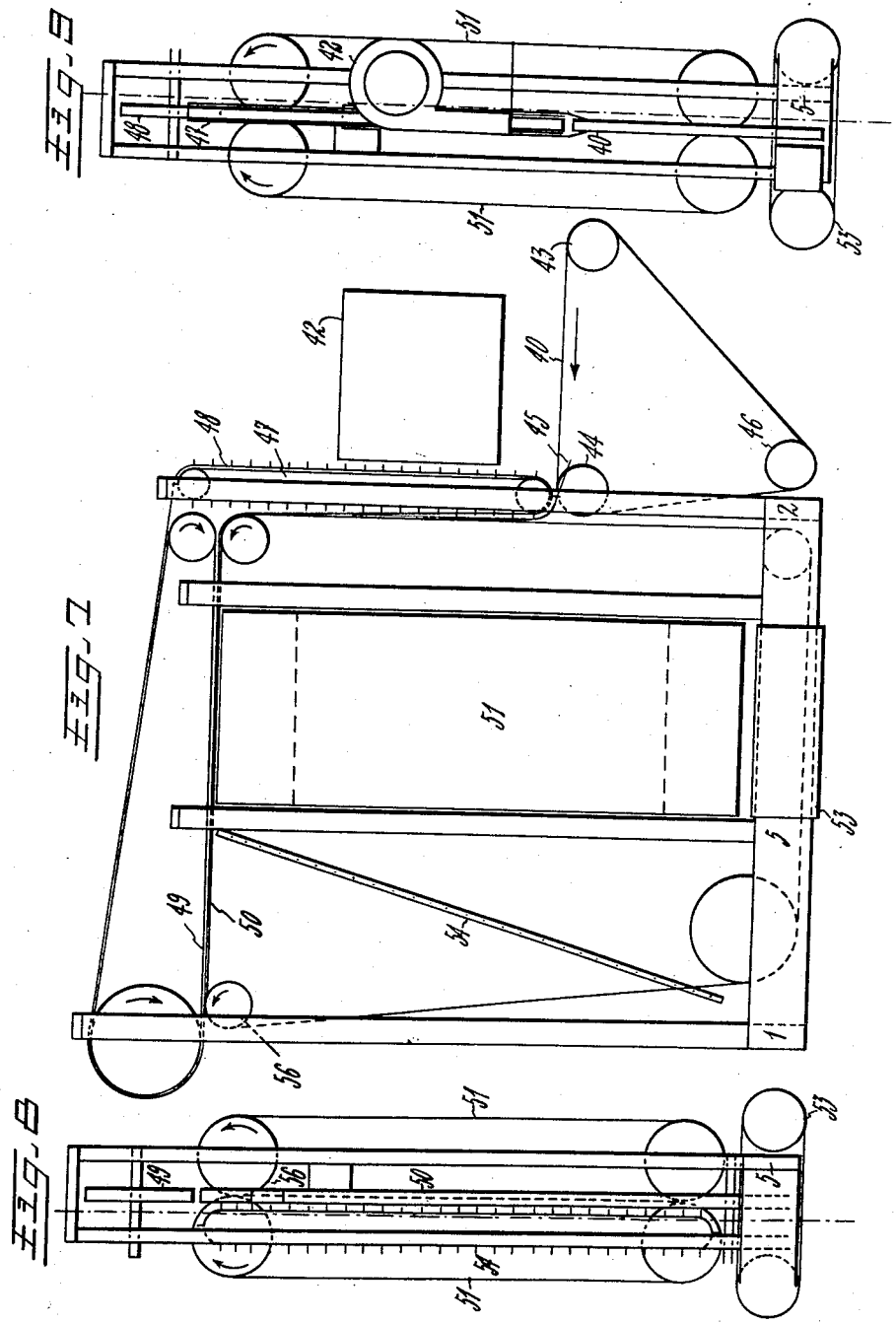

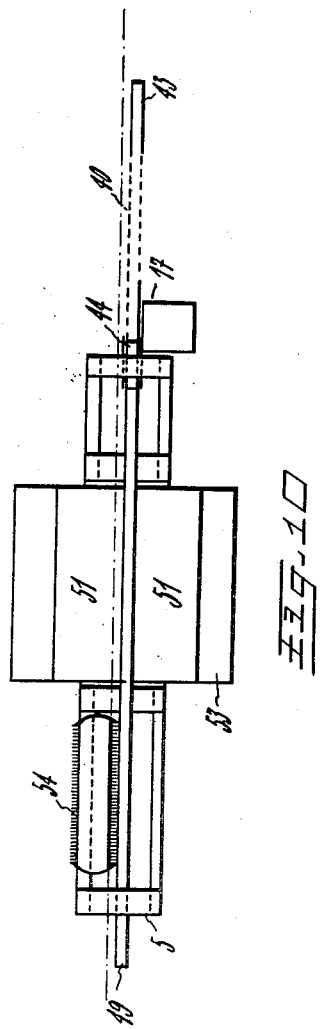

United States Patent Office 2,891,368
Patented June 23, 1959

2,891,368
BAST FIBER PLANT HARVESTING MACHINE

John M. Yovanovich, Mexico City, Mexico, and Joseph F. Dryer, Jr., Rochester, N.Y.

Application October 13, 1958, Serial No. 766,886

5 Claims. (Cl. 56—15)

This invention relates in general to harvesting machines and, more particularly, to machines for use in harvesting bast fiber plants. A machine of this type is shown in our copending application Serial No. 602,795, filed August 8, 1956, now abandoned, of which this application is a continuation-in-part.

Bast fiber plants, such as kenaf and jute, are characterized by fibers which extend the full length of the plant stalk and surround the plant's woody core. Although several machines have been proposed for the purpose of separating the fibers from the plant cores, it remains the practice throughout most of the fiber producing areas of the world to cut the plants with machetes, subject the cut plants to a retting action, and then to manually strip the bast from the plant's woody core. Most of the proposed machines are of the stationary type and cut stalks must be hand fed to the inputs of said machines in precision alignment. For a mobile bast fiber plant harvesting machine to be successful, the cut stalks must also be fed to the fiber separating portion of the machine in precision alignment. Prior to this invention, there has been no means available for achieving this result.

Accordingly, it is the general object of this invention to provide a new and improved bast fiber plant harvesting machine.

It is a more particular object of this invention to provide a new and improved bast fiber plant harvesting machine in which cut stalks are fed in precision alignment to the fiber separating portion of the machine.

Briefly, the harvesting machine, which forms the subject matter of this invention, accomplishes the above cited objects by performing the following successive operations:

(1) The harvesting machine, by the use of vertically moving chains complemented by guides, cuts a clean swath regardless of the inclination or entanglement of the stalks. The vertical chains separate the stalks growing outside the swath from those rooted within the swath. The chains disentangle the stalk tops and sever weeds which interconnect the stalks. The guides in conjunction with the chains guide all of the stalks growing within the swath into the harvesting machine and push aside all of the stalks growing outside the swath.

(2) The stalks entering the harvesting machine are then gripped between horizontally moving chains and guided toward a lower cutter bar which cuts the stalks just above ground level. Means is provided in the harvesting machine to insure that the speed of the horizontally moving chains is equal to the forward speed of the harvesting machine.

(3) The upper extremities of stalks which exceed a predetermined height are cut and eliminated by the action of a pair of circular saws and a blower.

The circular saws are positioned ahead of the lower cutter bar so that the stalks have been topped before the lower cutter bar engages the stalks. When cut by the lower cutter bar, the stalks are laid down full length, one by one, with precision, and are staggered in the middle of a conveyor belt. Precision delivery of the stalks is assured since the horizontally moving chains release their grip on the stalks at a point well past the lower cutter bar while the controlled cutting prevents the random movement of the stalks at that critical point.

(4) The severed stalks are carried by the conveyor belt to the pre-breaking rolls. Because of the precision positioning of the stalks on the conveyor belt, the stalks are spread as a mat of an average thickness over the entire working width of the crushing rolls, which immediately succeed the pre-breaking rolls. The pre-breaking rolls are interlocked so that the stalks are immediately gripped by the rolls and the conveyor belt is unloaded without interruption. The butt ends of the stalks, which are of larger diameter and have more brittle cores than the upper portions of the stalks, are subjected to a positive fragmentation between the pre-breaking rolls. The woody cores of the butt ends of the stalks are thus partially eliminated at this point in the operation to assure the proper cleaning of these parts of the plants. This action is complemented by the higher speed of rotation maintained at the next stage by the crushing rolls.

(5) The broken stalks are then crushed by a pair of crushing rolls into a mat of such thickness that the woody cores of the stalks can be effectively scutched out by the beater at the following stage, without damage to the fibrous material contained in the bast.

(6) The mat of crushed material is then carried to a beating and scutching drum where the particles of woody core remaining are removed from the bast. The beating and scutching drum comprises ribs mounted on a revolving drum. The ribs break the crushed woody cores against the edge of a concave shaped scutching apron, which surrounds a portion of the circumference of the drum, and in continuation scutch out the fragments while the bast is held against the face of the apron. The bast material is subjected to a cleaning operation by the action of a roll interlocked with the beating and scutching drum at the discharge end of the apron.

(7) The bast fibers emitted from the beating and scutching drum and the interlocked roll are then gripped and carried to a cleaning device which comprises a pair of mats revolving in a vertical plane. The fibers hang down between the mats and the combing action of the mats serves to remove any chips of core material remaining in the fiber. The cleaned fibers are then bundled and tied and discharged from the machine.

Further objects and advantages of the invention will be apparent as the following description proceeds and the features of novelty which characterize the invention will be pointed out in particularity in the claims annexed to and forming a part of this specification.

For a better understanding of the invention, reference may be had to the accompanying drawings which comprise ten figures on seven sheets.

Fig. 1 is a front view of a harvester unit mounted on a crawler tractor.

Fig. 2 is a side elevation view, taken from the tractor side, of the apparatus shown in Fig. 1.

Fig. 3 is a side elevation view, taken from the side opposite the tractor, of the apparatus shown in Fig. 1.

Fig. 4 is a plan view of the apparatus shown in Fig. 1 exclusive of the topping mechanism.

Fig. 5 is a plan view of the topping mechanism portion of the harvesting machine.

Fig. 6 is a rear view of the harvesting machine.

Fig. 7 is a rear view of a cleaning device which may be mounted at the rear of the harvesting machine.

Fig. 8 is a side elevation view, taken from the tractor side of the cleaning device shown in Fig. 7.

Fig. 9 is a side elevation view, taken from the side opposite the tractor, of the cleaning device shown in Fig. 7.

Fig. 10 is a plan view of the cleaning device shown in Fig. 7.

The harvester has been illustrated as an attachment mounted on a crawler tractor. It is to be understood that the harvester could be operated as a self-propelled unit with slight modification.

In the illustrated embodiment of the invention, means is provided for rigidly mounting the harvester and the cleaning device on the tractor. Lengthwise beams 1 and 2 are attached to the track frame of a crawler tractor. Crosswise beam 3 is attached to the front ends of beams 1 and 2 and also to the front ends of lengthwise beams 6 and 7. Crosswise beam 4 is attached to beams 1 and 2 and to the rear ends of beams 6 and 7. Crosswise beam 5, which supports the cleaning device of Fig. 7, is attached to the rear ends of beams 1 and 2. Beams 6 and 7 are also attached to the main frame of the tractor so that the tractor's suspension is effectively paralyzed. The sidings 8 and 9 of the harvester unit are carried on the cantilevered extremities of beams 3 and 4. Vertical beams 57 and 58 are also attached to lengthwise beam 1. Lengthwise beam 59, which is shown in Fig. 2, is attached to the upper ends of vertical beams 57 and 58. Crosswise beam 60 is attached to vertical beam 57, to vertical beam 61 and to side 9 for the purpose of affording additional support to the upper portion of the harvester. For the same purpose, crosswise beam 62, shown in Fig. 6, is attached to vertical beam 58 and to side 9.

The sidings 8 and 9, which are formed by supporting structures and metal sheeting and are rigidly interconnected by separator-tensors, house the apparatus concerned with the harvesting operation.

The vertical chains 10 and 11 run along the front edge of sidings 8 and 9, respectively. The outside chain 10 in combination with the guide 12, shown in Fig. 4, vertically separates and disentangles the stalks growing along the direct path of the harvester from the stalks rooted outside of this path. The inside chain 11 raises and straightens for a proper introduction between the sides 8 and 9 those stalks along the cutting path of the harvester which are leaning toward the cut field. As illustrated, chains 10 and 11 are provided with combing teeth or fingers to augment the lifting operation. The pre-raised and straightened stalks are then guided between sides 8 and 9. Chains 10 and 11 are driven by motors 80 and 82 and trained around sprocket wheels 81 and 83, respectively, and are designed to be driven so that the forward runs thereof travel upward when the motors are in operation.

The horizontally moving chains 13 and 14 grip the stalks entering the harvester, guide them toward cutter bar 15, hold them in position while they are cut, and then deposit them in orderly manner on conveyor belt 16. As shown in Fig. 4, chain 14 is trained around sprocket wheels 17, 84, 85, and 86 and chain 13 is trained around sprocket wheels 18, 87, 88, and 89. Chains 13 and 14 are driven in such manner that the inner runs thereof travel toward the rear of the machine at a speed equal to the forward speed of the harvesting machine. It can be seen in Fig. 4 that stalks entering the machine at the front edges of the side members 10 and 11 are converged toward the input of the longitudinally moving inner gripping runs of chains 13 and 14 by the runs of chains 13 and 14 between sprocket wheels 87 and 88 and between sprocket wheels 84 and 85, respectively. The stalks cut by cutter bar 15 are discharged at the output end of the longitudinally moving inner gripping runs of chains 13 and 14 at sprocket wheels 86 and 89 and laid down with precision on conveyor belt 16. The butt ends of the cut stalks engage the lower or input end of conveyor belt 16 before the gripped stalks are released by chains 13 and 14 so that the precision alignment of the cut stalks on conveyor 16 is assured.

Chains 13 and 14 are driven by sprocket wheels 17 and 18, which are geared to sprocket wheel 90 and a sprocket wheel corresponding to 90, respectively, by vertical miter gear boxes, as shown in Figs. 1 and 3.

Sprocket wheel 90 is driven by chain transmission 19 which is also trained around sprocket wheel 91 fast on shaft 21. Chain 20 is trained around a pair of sprocket wheels (not shown), one of which is geared to sprocket wheel 18 and the other of which is fast on shaft 21. Sprocket wheel 91 is, in turn, driven by belt 92 from the shaft of breaking roll 33 which is, in turn, driven by shaft 71 of the main transmission described more fully hereinafter.

Conveyor belt 16 is trained around rollers 93, 94, and 95 and is driven so that its upward surface travels upward and toward the rear of the machine. Drive for the conveyor is derived from the shaft of breaking roll 32, which is belted to breaking roll 33 as illustrated. It can be seen in Fig. 3 that the input end of conveyor 16 is positioned rearwardly and above cutter bar 15 and extends below the output end of the horizontal gripping chains 13 and 14.

The cutter bar 15, which is driven by motor 97, is supported by rack gears 22 and 23. The movement of wheel 24 is transmitted to the rack gears 22 and 23 to raise or lower the cutter bar 15 by means of pinion 25, shaft 96, the pair of chain transmissions marked 26, and the pair of pinion gears marked 27 which are interlocked with the gearing teeth of rack gears 22 and 23.

Referring to Fig. 5, it can be seen that the pair of saws 28 and 29 cut the portions of the stalks exceeding a maximum predetermined height. The blast from the blower 30 thrusts out the cut ends as they are projected against the screen 31. The circular saws 28 and 29 are positioned ahead of the lower cutter bar 15 so that the stalks are topped before the lower cutter bar engages the stalks. As previously mentioned, the stalks are securely gripped by chains 13 and 14 during and after the topping and cutting operations and are then deposited in orderly manner on conveyor belt 16.

Conveyor belt 16 carries the severed stalks to the pre-breaking rolls 32 and 33 while the mat 34 lowers the extremities of stalks not laid flat on conveyor belt 16. Mat 34 is trained around rollers 197 and 98 and roller 197 is driven by belt 92, the movement of which was previously described. The interlocked pre-breaking rolls 32 and 33 grip the stalks forwarded on belt 16, break up the woody cores of the stalks, and feed the stalks to the crushing rolls 35 and 36.

The crushing rolls 35 and 36 crush the material into a mat of substantially uniform thickness. The ribbed beating and scutching drum 37 breaks the woody cores within the stalks against the input or lower edge of the concave shaped apron 38, and carries the bast toward the point of contact with the interlocked roll 39. In this latter position, the bast is cleaned by the action of the interlocking ribs of drum 37 and roll 39.

The centrifugal blower 41 provides a blast of air which skims past roll 39 and is directed against drum 37. This blast of air forces the bast ejected from the point of contact between roll 39 and drum 37 to hang downward until the upper ends of the bast are ejected. Since drum 37 is revolving at a greater speed than the crushing rolls 35 and 36, the upper end of the bast is flipped over conveyor belt 40, shown in Figs. 7 and 10, and held in that position by a blast of air from blower 42. The transfer belt 40 is formed by a belt stretched between pulley 43, the loose pulley 44 mounted on a fork from which a guide 45 springs out, and the pulley mounted to the shaft of an electric motor 46. The mat 52 prevents contact between the lower ends of the bast ribbons and the ground while they are being transferred by belt 40.

The upper ends of the bast fibers carried on transfer belt 40 are gripped by the action of chain 47 against guide 45. The ends of the ribbons are then carried upward between belt 50 and endless ribbon 48 and the hanging fibers are subjected to a combining action between the rotating mats 51 as they are transported in a horizontal direction by belts 48 and 50. The mat 53, which is located beneath mats 51, removes chips combed from the fibers by mats 51.

The gripping chain 54 serves to grip the fibers issuing from between vertically rotating mats 51 and assures the simultaneous exit of the complete length of the ribbon. That is, chain 54 assures that the ribbon will be hanging in a vertical position at the time that the upper end of the ribbon reaches position 56. An agricultural type tie head may be located at position 56 for the purpose of binding the ribbons in bundles.

In the illustrated embodiment of the invention, which is intended as an example only, the movement of the various parts of the harvester is taken from the front power take off of the tractor by means of chain transmission 63, as shown in Fig. 1. The movement is transmitted through clutch 64 to electric generator 65 and to speed reducing chain transmission 66. Chain 66 is trained around sprocket wheel 99, which is fast upon shaft 100, and sprocket wheel 101, which is fast upon shaft 69. The movement is further transmitted by shaft 69 to sprocket wheel 102, which is fast upon shaft 69. Chain transmission 67 is trained around sprocket wheel 102 and sprocket wheel 103, which is fast upon shaft 104. The movement from speed reducing chain transmission 67 is transferred to speed reducing chain transmission 68 by shaft 104. Chain transmission 68 is trained around sprocket wheel 105, which is fast upon shaft 104, and sprocket wheel 106, which is fast upon shaft 107. Shaft 107 transmits the movement to miter gear 70 and the movement of miter gear 70 is transmitted to crushing roll 35 by shaft 71.

As shown in Fig. 3 of the drawings, the spur gears connecting the shafts of rolls 35 and 36 and the set of four spur gears connecting the shafts of drum 37 and roll 39 transmit the movement. The set of four spur gears comprises two gears 108 and 109 mounted on the shafts of roll 39 and drum 37, respectively, which two gears have odd numbers of teeth proportional to the diameters of the roll and drum. The other two gears 110 and 111 of the set are free wheeling, have an even number of teeth, and are of such diameter as necessary to complete the transmission. As previously described, the movements for the horizontal chains 13 and 14, for conveyor 16, and for mat 34 are derived from shaft 71. The movement of the various parts of the cleaning mechanism may be derived from the general transmission just described, or may be derived from suitable electric motors.

While there has been shown and described what is at present considered to be the preferred embodiment of the invention, it will be understood that various modifications may be made therein and it is intended to cover in the appended claims all such modifications as fall within the true spirit and scope of the invention.

What is claimed is:

1. A bast fiber plant harvesting machine comprising in combination a frame having first and second side members, first and second substantially vertically moving endless chains for segregating and aligning a group of stalks for introduction between said first and second side members, a first conveyor having input and output ends and comprising a pair of coacting longitudinally moving flexible members for gripping and conveying rearwardly stalks introduced between said first and second side members, cutting means mounted between said side members and positioned slightly above ground level, rearwardly of the input end, and forwardly of the output end of said first conveyor for cutting the gripped stalks, and a second conveyor for receiving and conveying rearwardly cut stalks issuing from the output end of said first conveyor.

2. The machine of claim 1 wherein said first and second endless chains are provided with combing teeth.

3. The machine of claim 1 wherein said first endless chain is positioned forwardly of said second endless chain.

4. The machine of claim 1 wherein the input end of said second conveyor extends beneath the output end of said first conveyor and the output end of said second conveyor is positioned rearwardly and above the output end of said first conveyor.

5. The machine of claim 4 including in combination a pair of revolving rollers positioned rearwardly of the output end of said second conveyor for receiving therebetween cut stalks issuing from the output end of said second conveyor.

No references cited.